(12) United States Patent
Gamet et al.

(10) Patent No.: US 11,114,929 B2
(45) Date of Patent: Sep. 7, 2021

(54) MEMS DEVICE

(71) Applicant: GOOGLE LLC, Mountain View, CA (US)

(72) Inventors: Julien Gamet, Saint Pierre d'Allevard (FR); Faouzi Khechana, Preverenges (CH); Nicolas Abele, Demoret (CH)

(73) Assignee: GOOGLE LLC, Mountain View, CA (US)

( * ) Notice: Subject to any disclaimer, the term of this patent is extended or adjusted under 35 U.S.C. 154(b) by 482 days.

(21) Appl. No.: 15/812,779

(22) Filed: Nov. 14, 2017

(65) Prior Publication Data

US 2018/0226870 A1      Aug. 9, 2018

Related U.S. Application Data

(63) Continuation of application No. 14/438,315, filed as application No. PCT/EP2012/071144 on Oct. 25, 2012, now Pat. No. 9,819,253.

(51) Int. Cl.
| | |
|---|---|
| *G02B 26/08* | (2006.01) |
| *H02K 33/18* | (2006.01) |
| *H02K 1/17* | (2006.01) |
| *H02K 1/34* | (2006.01) |

(52) U.S. Cl.
CPC ......... *H02K 33/18* (2013.01); *G02B 26/0833* (2013.01); *H02K 1/17* (2013.01); *H02K 1/34* (2013.01)

(58) Field of Classification Search
CPC ............ G02B 26/0833; G02B 26/0841; G02B 26/085; G02B 26/0858; G02B 26/08; G02B 26/10; G02B 26/12; G02B 26/033; G02B 26/101; G02B 26/105; H02K 33/18; H02K 1/34; H02K 1/17; H02K 26/00; H02K 11/0094; H02K 11/01; H02K 11/012; H02K 11/02; B81B 3/00; B81B 3/0083; B81B 3/0086; B81B 2203/04; B02B 26/08;
(Continued)

(56) References Cited

U.S. PATENT DOCUMENTS

| | | | | |
|---|---|---|---|---|
| 5,834,864 | A | * | 11/1998 | Hesterman ............. H02K 33/18 310/40 MM |
| 5,912,608 | A | * | 6/1999 | Asada .................. G02B 26/085 335/222 |
| 6,392,220 | B1 | | 5/2002 | Slater et al. |

(Continued)

FOREIGN PATENT DOCUMENTS

| | | |
|---|---|---|
| CN | 102570766 A | 7/2012 |
| CN | 105676447 A | 6/2016 |

(Continued)

OTHER PUBLICATIONS

Chinese Office Action issued in Chinese Application No. 201280077991. 2, dated Feb. 3, 2016, with English translation, 19 pages.
(Continued)

*Primary Examiner* — Mustak Choudhury

(57) ABSTRACT

According to the present invention there is provided a device comprising a MEMS die and, a single magnet, wherein the MEMS die cooperates with the magnet, such that the MEMS die is submerged in a magnetic field provided by the magnet; wherein the magnet is a single multi-pole magnet.

13 Claims, 15 Drawing Sheets

(58) Field of Classification Search
CPC . B02B 26/085; B02B 26/023; B02B 26/0858;
B02B 26/101; G01Q 10/04
USPC ......... 359/198.1–199.4, 200.6–200.8, 202.1,
359/213, 221.2, 223.1–225.1, 226.2, 230,
359/290–295, 838, 846, 871, 872;
250/204, 559.06, 559.29, 230, 234;
347/255–260; 353/39, 98–99;
385/15–18, 22; 398/12, 19, 45; 335/219
See application file for complete search history.

(56) References Cited

U.S. PATENT DOCUMENTS

| | | | |
|---|---|---|---|
| 2002/0075786 A1 | 6/2002 | Ikegame | |
| 2003/0202234 A1 | 10/2003 | Taylor et al. | |
| 2005/0253055 A1* | 11/2005 | Sprague | G02B 26/0858 250/234 |
| 2006/0220081 A1 | 10/2006 | Nagai et al. | |
| 2007/0296532 A1* | 12/2007 | Ko | H02K 33/18 335/219 |
| 2010/0104330 A1* | 4/2010 | Choi | G03G 15/326 399/301 |
| 2013/0003155 A1 | 1/2013 | Cugat et al. | |

FOREIGN PATENT DOCUMENTS

| | | |
|---|---|---|
| EP | 0763881 A2 | 3/1997 |
| EP | 1876139 A2 | 1/2008 |
| EP | 3163352 A1 | 5/2017 |
| JP | 2005-99063 A | 4/2005 |
| WO | 2011-051620 A2 | 5/2011 |
| WO | 2014-063737 A1 | 5/2014 |

OTHER PUBLICATIONS

Chinese Office Action issued in Chinese Application No. 201280077991.2, dated Sep. 28, 2016, with English translation, 10 pages.
International Search Report and Written Opinion issued in PCT Application No. PCT/EP2012/071144, dated Sep. 18, 2013, 18 pages.
International Preliminary Report on Patentability and Written Opinion issued in PCT Application No. PCT/EP2012/071144, dated Apr. 28, 2015, 13 pages.
Notice of Allowance issued in U.S. Appl. No. 14/438,315, dated Jun. 30, 2017, 11 pages.
Office Action issued in U.S. Appl. No. 14/438,315, dated Dec. 1, 2016, 18 pages.

* cited by examiner

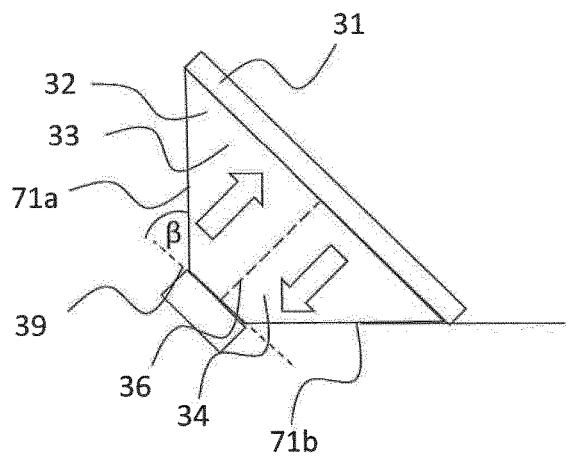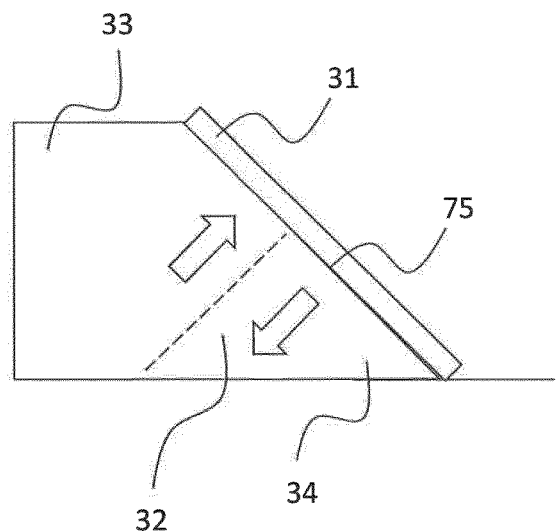
Fig. 7a          Fig. 7b
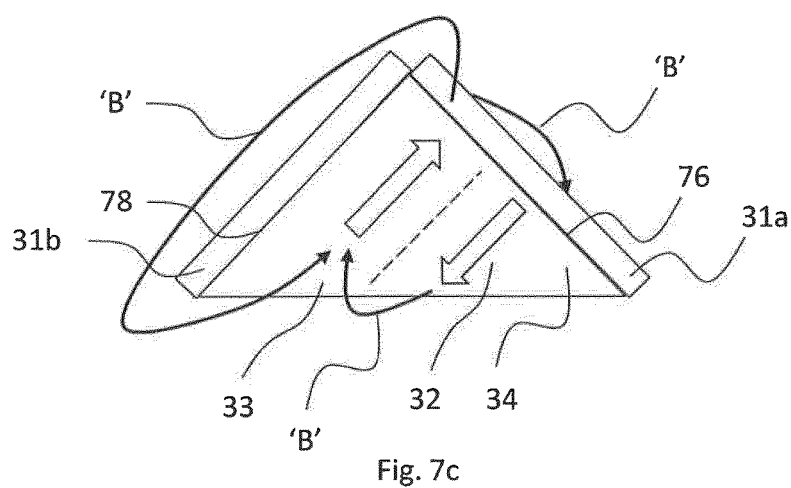
Fig. 7c

MEMS DEVICE

FIELD OF THE INVENTION

The present invention concerns a MEMS device which comprises MEMS micro mirror, and a current conducting actuation coil which can effect oscillation of the MEMS micro mirror about an oscillation axis in the presence of a magnetic field, wherein the magnetic field is provided by a magnet which is a single multi-pole magnet.

DESCRIPTION OF RELATED ART

A MEMS micro-mirror device is a device that contains an optical MEMS (Micro-Electrical-Mechanical-System). The optical MEMS may comprise an elliptical, cylindrical, rectangular, square or random shape micro-mirror that is adapted to move and to deflect light over time. The micro-mirror is connected by suspended arms to a fixed part and can tilt and oscillate along one or two axis. For example it can oscillate vertically and horizontally. Different actuation principles can be used, including electrostatic, thermal, electro-magnetic or piezo-electric. MEMS devices are known in which the area of these micro-mirrors are around a few $mm^2$. In this case, the dimensions of the MEMS device, comprising the packaging, is around ten $mm^2$. This device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete system.

A typical application of the MEMS micro-mirror devices is for optical scanning and projection systems. In a projection system, a 2-D image or a video can be displayed on any type of surface. In a colour system, each pixel is generated by combining modulated red, green and blue laser light sources, by means of, for example, a beam combiner. A MEMS micro-mirror device directs the light of the laser light source to a projection surface and reproduces the image, or the video, pixel-by-pixel. By means of its oscillations, the micro-mirror within the device will continuously scan from left to right and right to left, and from top to bottom, or according to a different trajectory including e.g. Lissajou trajectories, so that each pixel of the 2-D image is displayed on the screen.

Typically, the micro-mirror of a MEMS micro-mirror device is able to oscillate along one axis. Therefore, in order to display a 2-D image on a screen a projection system will require two MEMS micro-mirror devices; a first MEMS micro-mirror device is required to deflect light along the horizontal and a second MEMS micro-mirror device is required to deflect light along the vertical. Alternatively the projection system will require a single MEMS micro-mirror device which comprises a MEMS micro-mirror which can be oscillated about two orthogonal oscillation axes.

Referring to FIGS. 1a and 1b; FIGS. 1a and b illustrate a typical architecture of a known MEMS micro-mirror device 1. The MEMS micro-mirror device 1 comprises a MEMS die 10 which is arranged in cooperation with an assembly of three magnets 6a,b,c. A plan view of the MEMS die 10 is shown in FIG. 1b. The MEMS die comprises a first support frame 2; and torsional bars 3a,b which connect a MEMS micro mirror 4 to the first support frame 2. The torsional bars 3a,b define an oscillation axis 7 for the MEMS micro mirror 4. A first actuation coil 5 is supported on, and connected to, the MEMS micro mirror 4. Collectively, the first support frame 2, torsional bars 3a,b, and MEMS micro mirror 4, and first actuation coil 5, define the a MEMS die 10.

The first support frame 2 is connected to the assembly of three magnets 6a,b,c. Typically this is done in a manner which ensures that the assembly of three magnets 6a,b,c are located below the MEMS micro mirror 4. As can been seen in FIG. 1a, each of the magnets 6a,b,c have a different direction of magnetization (the direction of magnetization of each magnet 6a,b,c is indicated by arrows 9a,b,c respectively). The assembly of magnets 6a,b,c generate a magnetic field 'B' which submerges the MEMS die 10.

During use an electric current 'I' is passed through the actuation coil 5 which is connected to the MEMS micro mirror 4. As the actuation coil 5 is submerged in the magnetic field 'B' created by the assembly of three magnets 6a,b,c, the actuation coil 5 will provide a Laplace force which will be applied to the MEMS micro mirror 4. The Laplace force will cause the MEMS micro mirror 4 to oscillate about its oscillation axis 7.

It should be understood that the MEMS micro-mirror device 1 could be configured to enable oscillation of the MEMS micro mirror 4 about two orthogonal axes, so that the MEMS micro mirror 4 can scan light in two dimensions (horizontal and vertical). A MEMS die 20 which will enable oscillation of the MEMS micro mirror 4 about two orthogonal axes is shown in FIG. 2. It will be understood that in practice this MEMS die 20 would cooperate with an assembly of three magnets 6a,b,c (not shown) to define a MEMS micro-mirror device. The MEMS die 20 comprises all the features of the MEMS die 10 shown in FIG. 1b and like features are awarded the same reference numbers. The MEMS die 20 further comprises a second support frame 12; the first support frame 2 is connected to the second support frame 12 via another set of torsional bars 13a,b. The torsional bars 13a,b, define a second oscillation axis 17 which is orthogonal to the first oscillation axis 7. A second actuation coil 15 is connected to the first support frame 2. This second actuation coil 15 will also be submerged by the magnetic field 'B' provided by the assembly of three magnets 6a,b,c. Collectively, the first support frame 2, torsional bars 3a,b, MEMS micro mirror 4, first actuation coil 5, the second support frame 12 and torsional bars 13a,b, and second actuation coil 15, define the MEMS die 20.

During use an electric current 'i' is passed through the actuation coil 5 which is connected to the MEMS micro mirror 4. As the actuation coil 5 is submerged in the magnetic field 'B' created by the assembly of three magnets 6a,b,c, the actuation coil 5 will provide a Laplace force which will be applied to the MEMS micro mirror 4. The Laplace force will cause the MEMS micro mirror 4 to oscillate about the first oscillation axis 7. An electric current 'I' is also passed through the second actuation coil 15 which is connected to the first support frame 2. As the second actuation coil 15 is also submerged in the magnetic field 'B' created by the assembly of three magnets 6a,b,c, the second actuation coil 15 will provide a Laplace force which will be applied to the first support frame 2. The force will cause the first support frame 2, and thus the MEMS micro mirror 4 which is connected to the first support frame 2 via the torsional arms 3a,b, to oscillate about the second oscillation axis 17. Accordingly the MEMS micro mirror 4 will be oscillated about two orthogonal oscillation axes 7,17. If the MEMS micro mirror 4 reflects light as it is oscillating about the two orthogonal oscillation axes 7,17 the reflected light will be scanned in two dimensions e.g. horizontal and vertical. This will, for example, enable the light to be scanned across a projection screen.

Advantageously, the use of an assembly of three magnets 6a,b,c generates a stronger magnetic field 'B' compared to if just a single magnet was used to generate the magnetic field 'B'. However, disadvantageously since the MEMS micro-mirror device 1 comprises assembly of three magnets 6a,b,c, during manufacture these magnets 6a,b,c need to be cut so that they each have equal dimensions, aligned, and then fixed in their aligned position. Otherwise the support frame 2 which rests on the assembly of three magnets 6a,b,c, and thus the MEMS micro mirror 4, will be offset from a desired, level, orientation. Such precise cutting, alignment and fixing is difficult to achieve.

Inaccuracies in the cutting of the magnets 6a,b,c means that after the magnets 6a,b,c are cut, aligned and fixed together, polishing of the magnets 6a,b,c needs to be performed to as to ensure that the magnets 6a,b,c have equal, or at least near equal, dimensions. The particles removed during polishing are magnetic particles and so stick to the magnets 6a,b,c. The problem cannot be avoided since the material which defines each magnet 6,a,b,c must always first be magnetized before the they are connected to form the assembly of magnets i.e. it is not possible to connect the material which is to define the assembly of three magnets 6a,b,c and then magnetize the material after connection, since each of the three magnets 6a,b,c are required to provide a different direction of magnetization.

The three magnets 6a,b,c are typically connected using glue. During use of the MEMS micro-mirror device 1, as the temperature of the device 1 increases, the glue may become soft or melt, allowing the magnets 6a,b,c to become displaced so that they are not longer in alignment.

Furthermore the use three magnet 6a,b,c increases the overall cost of the device.

It is an aim of the present invention to obviate or mitigate at least some of the above-mentioned disadvantages.

BRIEF SUMMARY OF THE INVENTION

According to the invention, there is provided a device comprising a MEMS die and, a single magnet, wherein the MEMS die cooperates with the magnet, such that an actuation coil on the MEMS die is submerged in a magnetic field provided by the magnet; wherein the magnet is a single multi-poles magnet.

Preferably the actuation coil is provided on a MEMS mirror of the MEMS die. The actuation coil is a coil which cooperates with a MEMS mirrors of a MEMS die and effects oscillation of the MEMS mirror when it conducts current in the presence of the magnetic field generated by the single magnet. The actuation effects oscillation of the MEMS mirror by applying a Laplace force to the MEMS mirror.

Preferably, the MEMS die cooperates with the magnet such that an actuation coil and detection coil on the MEMS die is submerged in a magnetic field provided by the magnet. A detection coil is a coil in which induced current can flow; the induced current a current which is induced in the coil when the detection coil moves within the magnetic field. The detection coil is moved within the magnetic field by the oscillation of the MEMS mirror. The induced current will be indicative of the oscillation angle of the MEMS mirror.

Preferably the MEMS die cooperates with the magnet such that the MEMS die is submerged in a magnetic field provided by the magnet.

Advantageously, as the device uses a single magnet, manufacturing of the device does not require connecting a plurality of magnets to form a magnet assembly, or polishing the plurality of magnetized magnets in the magnetic assembly to ensure each magnet has equal dimensions.

Preferably during manufacture the material which is to define the single magnet is cut and polished while it is not yet magnetized so that particles removed when polishing will not stick on the multi-pole magnet. After cutting and polishing is complete the material which defines the single multi-pole, may then be magnetized.

The magnet may be configured to have a first portion which has a first direction of magnetization and a second portion which has a second direction of magnetization. The first direction of magnetization is preferably opposite to the second direction of magnetization.

In the present application, the direction of magnetisation is the direction of the magnetic flux/field. It will be understood that the direction of magnetisation is defined by the positioning of magnetic poles; for example for the magnet to have a first portion which has a first direction of magnetization and a second portion which has a second direction of magnetization, then the first portion must comprise a north and south magnetic pole and the second portion must comprise a north and south magnetic pole. In order for the direction of magnetisation in each portion to be opposite then the arrangement of the magnetic north and south poles will be inverted in each portion. The magnet is preferably configured to comprise four or more magnetic poles. The four or more magnetic poles may comprise at least two north magnetic poles and at least two south magnetic poles.

The MEMS die may comprise some or all of the features of the MEMS dies know from the prior art.

As known from the prior art the MEMS die may comprise a first support frame which is connected to a MEMS mirror via torsional arms, wherein the torsional arms define a first oscillation axis for the MEMS mirror; and an actuation coil which is secured to the MEMS mirror such that the actuation coil can be used to oscillate the MEMS mirror about the first oscillation axis when the actuation coil conducts current and is subjected to a magnetic field provided by the magnet.

As known from the prior art the MEMS die further comprises a second support frame, wherein the second support frame is connected to the first support frame via torsional bars which define a second oscillation axis, wherein the second oscillation axis is orthogonal to the first oscillation axis; and a second actuation coil which is secured on the first support frame such that the second actuation coil can be used to oscillate the first support frame, and thus oscillate the MEMS mirror, about the second oscillation axis, when the second actuation coil conducts current and is subjected to the magnetic field provided by the magnet.

The magnet may comprise a permanent magnet.

Preferably, the MEMS die will be arranged to cooperate with a first surface of the magnet. The magnet may comprise a second surface which is opposite to the first surface. Preferably the first and second surfaces are parallel.

Preferably the MEMS die will cooperate at a first surface thereof with the magnet. The MEMS die may further comprise a second surface which is opposite to the first surface.

The device may further comprise ferromagnetic material which is arranged to surround a periphery of the magnet so as to reduce the amount of magnetic field which is leaked from the device. Preferably the ferromagnetic material is arranged to surround the whole periphery of the magnet.

The device may comprise ferromagnetic material which is arranged to surround a periphery of the magnet and a periphery of the MEMS die, so as to reduce the amount of magnetic field which is leaked from the device. Preferably the ferromagnetic material is arranged to surround the whole periphery of the magnet and MEMS die.

Preferably the ferromagnetic material is configured to extend above a plane defined by the MEMS die. Preferably the ferromagnetic material may be configured to extend above the second surface of the MEMS die. Advantageously this will ensure that the magnetic field in the region of the MEMS mirror of the MEMS die will be more uniform, in terms of force homogeneity and in terms of distribution.

The magnet may comprise a first surface. The MEMS die may cooperate with the first surface of the magnet. The magnet may comprise a second surface which is opposite to the first surface. Preferably the first and second surfaces are parallel.

'Cooperation' in the context of the present invention includes, but is not limited to, connection, abutment and supporting.

The magnet may comprise one or more chamfered edges. Advantageously, this will decrease the size of the device.

Preferably, the chamfered edges are chamfered at an angle of 45° to a plane defined by a surface of the magnet. Preferably the chamfered edges are chamfered at an angel of 45° to a plane defined by a second surface of the magnet.

The magnet may comprise bevelled edges. Preferably the bevelled edges are bevelled at an angel of 45° to a plane defined by a second surface of the magnet The magnet may be arranged in a projection device and may be secured in the projection device along its chamfered or bevelled edge or edges.

The device may further comprise a second MEMS die. The second MEMS die may cooperate with the magnet such that the second MEMS die is submerged in a magnetic field provided by the magnet. The second MEMS die may have some or all of the features of the first MEMS die mentioned above.

The first MEMS die may be configured to have a MEMS mirror which oscillates about a first oscillation axis, and the second MEMS die may be configured to have a MEMS mirror which oscillates about a second oscillation axis, wherein the first and the second MEMS dies are positioned such that the first and second oscillation axes are orthogonal, and such that their respective MEMS mirrors are in optical communication with one another, so that light reflected by the MEMS mirrors of the first and second MEMS dies can be scanned in two dimensions.

The first and second MEMS dies are preferably positioned on the magnet. The magnet may be configured to comprise a first and second triangular cross sectioned portions, each triangular cross sectioned portion comprising a first portion which has a first direction of magnetization and a second portion which has a second direction of magnetization. The first direction of magnetization is preferably opposite to the second direction of magnetization. The first MEMS die is preferably positioned on the first triangular cross sectioned portion and the second MEMS die is preferably positioned on the second triangular cross sectioned portion. The first and second MEMS dies are preferably positioned so that they are substantially facing one another. The first and second MEMS dies are preferably positioned so that they are in optical communication with one another. Preferably the magnet is shaped so as to allow such positioning of the first and second MEMS dies. For example the magnet may be configured to have a square or rectangular shaped cross section with a v-shaped cut-out so that the first and second MEMS dies can be positioned on opposing surfaces of the magnet which define the v-shaped cut out.

The device may further comprise a plurality of MEMS dies. Each of the MEMS dies may cooperate with the magnet, such that each of the MEMS dies is submerged in a magnetic field provided by the magnet. Each of the MEMS dies may have some or all of the features of the first MEMS die mentioned above.

Preferably the magnet may be configured to have a plurality of surfaces, and each of the plurality of MEMS dies will cooperate with a different surface. For example, the magnet may be configured to have a triangular cross section so that it has at least three surfaces, and one of three MEMS dies may cooperate with a respective surface. Similarly, the magnet may be configured to comprise six surfaces or any number of surfaces, for example the magnet may be configured to have a hexagonal cross section so that it has six surfaces and could have one MEMS die positioned on each of the six surfaces.

The magnet may comprise isotropic material.

The magnet may comprise anisotropic material.

As discussed the magnet may be configured to comprise a first portion which has a first direction of magnetisation and a second portion which has a second direction of magnetisation.

The magnet may be configured to further comprise a third portion which has a third direction of magnetisation, and a fourth portion which has a fourth direction of magnetisation.

The magnet may be configured to further comprise a fifth portion which has a direction of magnetisation which is equal to the first direction of magnetization.

The magnet may be configured to have a square shaped cross section.

The magnet may be configured to have a square or rectangular shaped cross section with a v-shaped cut-out.

The magnet may be configured to have a triangular shaped cross section.

The magnet may be configured to have a u-shaped cross section.

The magnet may be configured to further comprise one or more flanges.

The MEMS die may be arranged so that it is partially surrounded by the magnet. In this case the magnet may be configured such that at least a part of magnet surrounds a periphery of the MEMS die. To achieve this, the magnet may be, for example, configured to comprise a recess which can receive the MEMS die.

The MEMS die may be arranged so that it is supported on the first surface of the magnet.

The magnet may be configured to comprise a recess will allow the MEMS mirror of the MEMS die to undergo full oscillation. The magnet may be configured to comprise a recess which can receive at least part of the MEMS mirror of the MEMS die, as the MEMS mirror oscillates, so as to allow the MEMS mirror of the MEMS die to undergo full oscillation. The recess will allow the MEMS mirror of the MEMS die to undergo, unrestricted, oscillation.

The MEMS mirror of the MEMS die may comprise a first and a second reflective surface. The first and second reflective surfaces may define opposing surfaces of the MEMS mirror.

The magnet may further comprise an aperture, which is adjacent the MEMS mirror of the MEMS die, which enables light to pass through the magnet and be received by the second surface of the MEMS mirror.

The magnet may be configured to comprise a first portion which has a first direction of magnetisation, a second portion which has a second direction of magnetisation, a third portion which has a direction of magnetisation equal to the first direction of magnetisation, and a fourth portion which has a direction of magnetisation which is equal to the second direction of magnetisation.

The first, second, third and fourth portions may be 'I' shaped, along a plane which is parallel to a plane of the die. In other words each of the first, second, third and fourth portions may be configured to have an I-shaped transverse section. In other words each of the first, second, third and fourth portions may be configured to have a rectangular shaped transverse section. Alternatively each of the first, second, third and fourth portions may be configured to have a square shaped transverse section. It will be understood that each of the first, second, third and fourth portions may be configured to have any suitably shaped transverse section.

The first portion may be configured so that it is 'c' shaped and the fourth portion configured so that it is reverse 'c' shape, along a plane which is parallel to a plane of the die. In other words the first portion may be configured to have a c-shaped transverse section and the fourth portion may be configured to have a reverse-c-shaped transverse section.

The magnet may be configured such that the first actuation coil in the MEMS device, is adjacent to an interface between the first and second portions and adjacent to an interface between the third and fourth portions. Each interface may be defined by the junction between the respective portions.

The magnet may be configured to further comprise a fifth portion which has a direction of magnetisation which is equal to the first direction of magnetisation, and a sixth portion which has a direction of magnetisation which is equal to the second direction of magnetisation, and a seventh portion which has a direction of magnetisation which is equal to the first direction of magnetisation, and an eight portion which has a direction of magnetisation which is equal to the second direction of magnetisation.

The fifth, sixth, seventh and eight portions may be 'I' shaped, along a plane which is parallel to a plane of the die. In other words each of the fifth, sixth, seventh and eight portions may be configured to have an I-shaped transverse section. In other words each of the fifth, sixth, seventh and eight portions may be configured to have a rectangular shaped transverse section. Each of the fifth, sixth, seventh and eight portions may be configured to have a square shaped transverse section. It will be understood that each of the fifth, sixth, seventh and eight portions may be configured to have any suitably shaped transverse section.

The fifth portion may be configured have a 'c' shape and the eight portion may be configured to have an reverse 'c' shape, along a plane which is parallel to a plane of the die. In other words fifth portion may be configured to have a c-shaped transverse section and the eight portion may be configured to have an reverse-c-shaped transverse section.

The magnet may be configured such that a second actuation coil on the MEMS die is adjacent to an interface between the fifth and sixth portions and adjacent to an interface between the seventh and eight portions. Each interface may be defined by the junction between the respective portions.

The magnet may further comprise one or more areas of reduced thickness which provide for a decrease in the magnetic field in the region of the one or more areas of reduced thickness. Preferably the one or more areas of reduced thickness provide for a substantially zero, or zero, magnetic field in the region of the one or more areas of reduced thickness. The areas of reduced thickness may be defined by one or more channels.

The magnet may be configured to comprise an area of reduced thickness which is located at an interface between the sixth portion and a central portion of the magnet which comprises the first, second, third and fourth portions of the magnet. For example the magnet may be configured to comprise a channel which is located at an interface between the sixth portion and a central portion of the magnet which comprises the first, second, third and fourth portions of the magnet.

The magnet may be configured to comprise an area of reduced thickness which is located at an interface between the seventh portion and a central portion of the magnet which comprises the first, second, third and fourth portions of the magnet For example the magnet may be configured to comprise a channel which is located at an interface between the seventh portion and a central portion of the magnet which comprises the first, second, third and fourth portions of the magnet.

BRIEF DESCRIPTION OF THE DRAWINGS

The invention will be better understood with the aid of the description of embodiments which are given by way of example only and illustrated by the figures, in which:

FIGS. 7 a,b,c provide a side views of devices according to a further embodiments of the present invention, and in particular illustrate the different possible shapes which the magnetic could have;

FIG. 12a provides a plan view of, an underside of a device according to a further embodiment of the present invention and FIG. 12b provides cross section view along A-A' of FIG. 12a;

FIG. 13b provides a cross-sectional view of a device which uses the magnet shown in FIG. 13a;

DETAILED DESCRIPTION OF POSSIBLE EMBODIMENTS OF THE INVENTION

Figure 3:
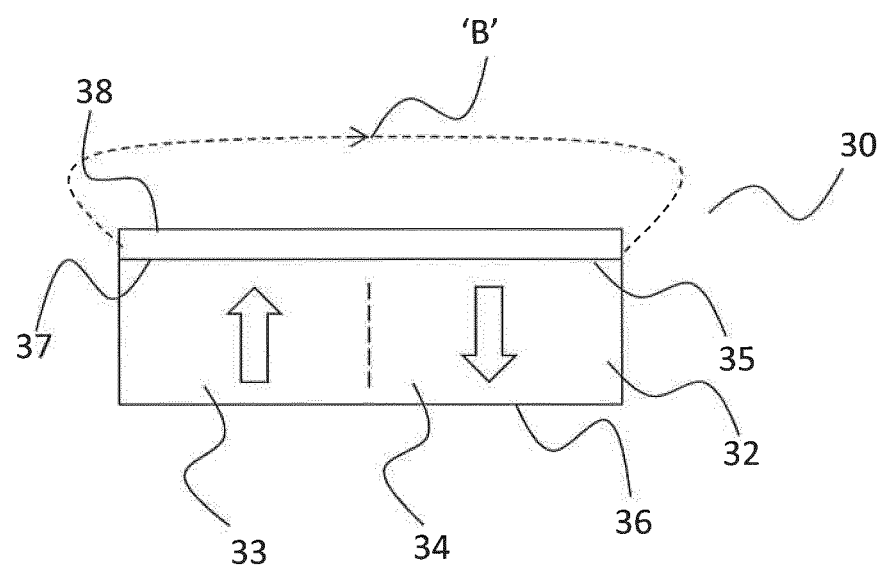
FIG. 3 provides a side view of a device according to a first embodiment of the present invention.

FIG. 3 provides a side view of a device 30 according to a first embodiment of the present invention. The device 30 comprises a MEMS die 31 and, a single multi-pole magnet 32. The MEMS die 31 cooperates with the single multi-pole magnet 32, such that an actuation coil (not shown) which is provided on a MEMS mirror of the MEMS die 31 is submerged in a magnetic field 'B' provided by the magnet 32.

Figure 1A:
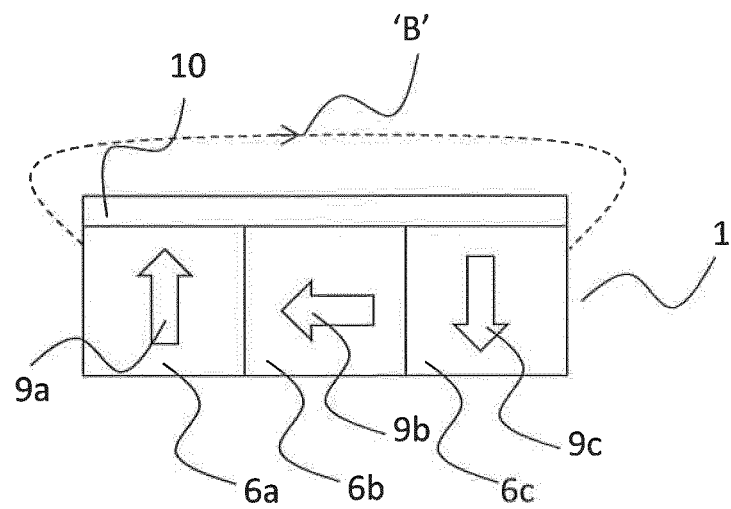
FIGS. 1a and b provide a side and plan view, respectively, of a MEMS micro-mirror device as known from the prior art.
Figure 1B:
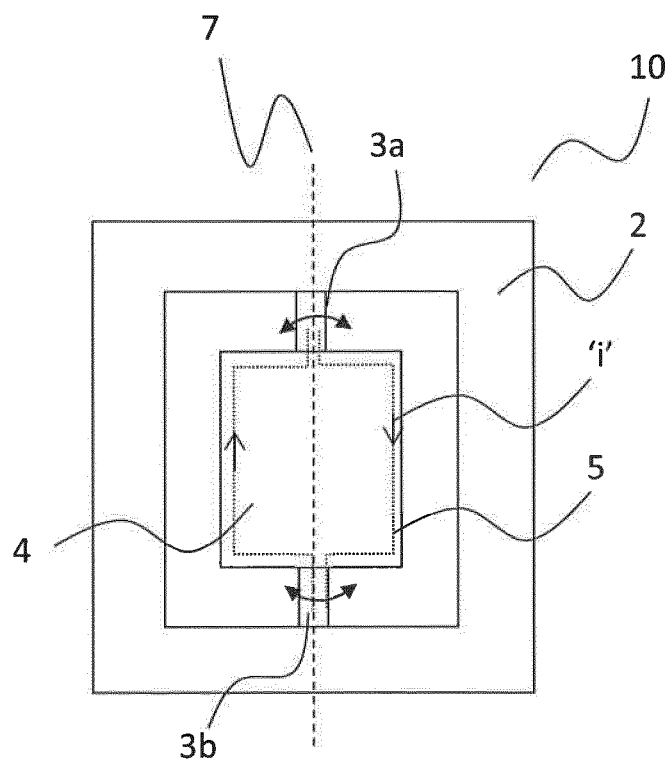
Figure 2:
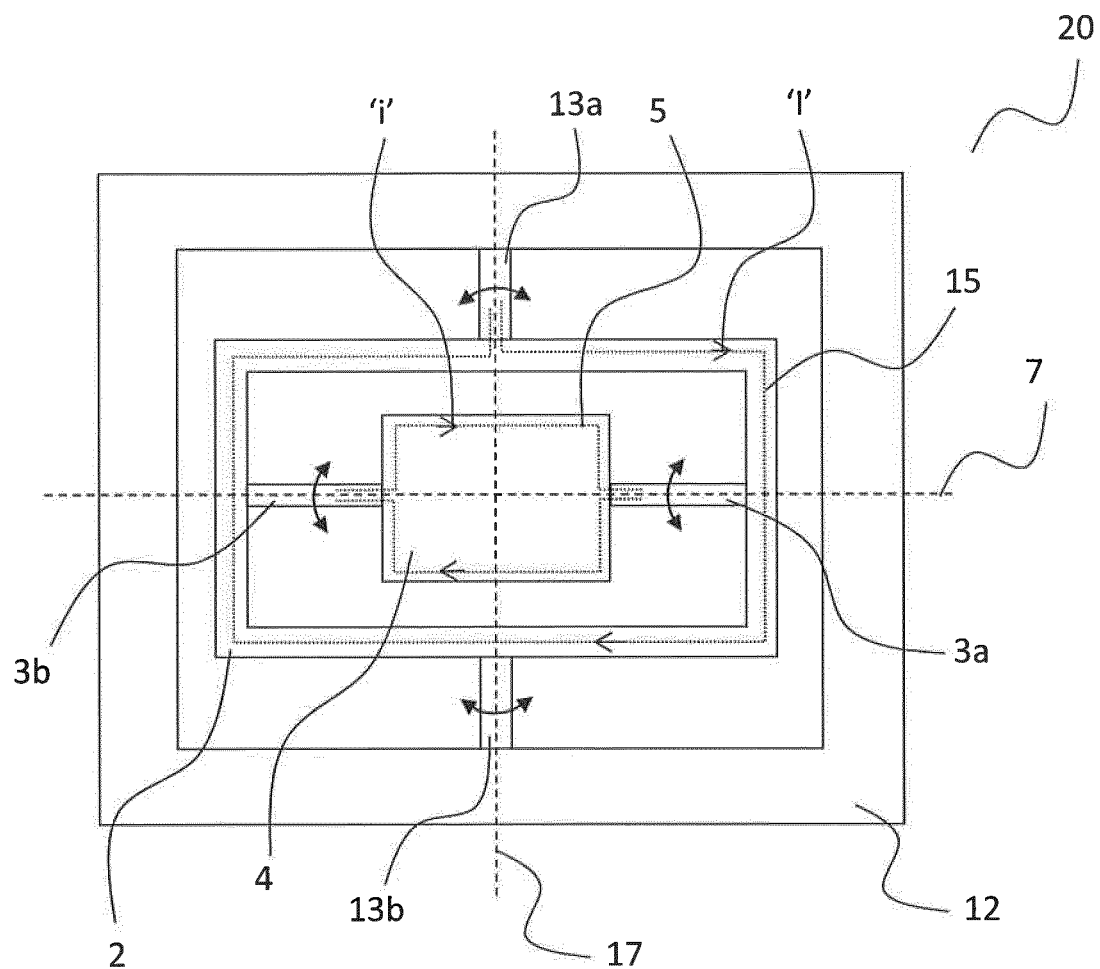
FIG. 2 provides a plan view another MEMS die known from the prior art, which could be used in the device of FIG. 1.

The MEMS die 31 may comprise some or all of the features of the MEMS dies 10, 20 shown in FIGS. 1b and 2. The MEMS die 31 is connected to the magnet 32 at its first or second support frames (not shown).

The MEMS die 31 is arranged to cooperate with a first surface 35 of the magnet 32. The magnet 32 comprises a second surface 36 which is opposite to the first surface 35. The magnet 32 is configured so that the first and second surfaces 35, 36 are parallel to one another. The MEMS die 32 also comprises a first and second surface 37, 38. The first surface 37 of the MEMS die cooperates the first surface 35 of the magnet 32. The second surface 38 of MEMS die is opposite to the first surface 37. MEMS die is configured so that the first and second surfaces 37,38 of the MEMS die 31 are parallel to one another.

The single magnet 32 which is provided in the device 1 is a multi-pole magnet 32. The magnet 32 is configured to have a first portion 33 which has a first direction of magnetization and a second portion 34 which has a second direction of magnetization. The direction of magnetisation is indicated by arrows which are provided in each portion 33,34. The first direction of magnetization is opposite to the second direction of magnetization.

In the present application, the direction of magnetisation is direction of the magnetic flux/field. It will be understood that the direction of magnetisation is defined by the positioning of magnetic poles; for example for the magnet 32 to have a first portion 33 which has a first direction of magnetization and a second portion 34 which has a second direction of magnetization, then the first portion 33 must comprise a north and south magnetic pole (not shown) and the second portion 34 must also comprise a north and south magnetic pole (not shown). The magnet 32 of the device 30 shown in FIG. 3 therefore comprises at least four poles; two north poles and two south poles; a magnetic pole pair will be located in the first portion 33 and a second magnetic pole pair will be located in the second portion 34. For the direction of magnetisation of the first portion to be opposite the direction of magnetisation of the second portion the arrangement of the magnetic poles in the first portion must be opposite to the arrangement of the magnetic poles in the second portion.

The magnet 32 is configured to have a rectangular shaped cross section and may comprise isotropic material or anisotropic material. In the particular example illustrated in FIG. 3, the magnet 32 comprises anisotropic material. If the magnet 32 comprises anisotropic material the first and second portions 33, 34 of the magnet 32 can be configured to have one of only two possible magnetization directions. Advantageously, if the magnet 32 would comprise isotropic material then the first and second portions 33, 34 of the magnet 32 could be provided with any direction of magnetization.

Advantageously, as the device 30 uses a single magnet 32, manufacturing of the device 30 does not require connecting a plurality of magnetized magnets to form a magnet assembly, or polishing a plurality of magnets in a magnetic assembly to ensure each magnet in the assembly has equal dimensions.

Figure 4:
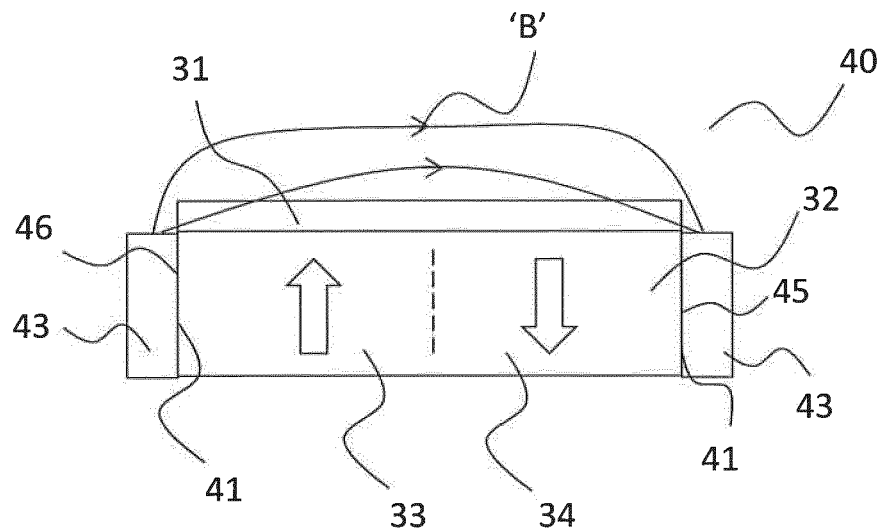
FIG. 4 provides a side view of a device according to a further embodiment of the present invention.

FIG. 4 provides a side view of a projection device 40 according to another embodiment of the present invention. The device 40 has many of the same features of the device 1 shown in FIG. 3 and like features are awarded the same reference numbers.

The device 40 further comprises ferromagnetic material 43 which is arranged to surround a periphery 41 of the single multi-pole magnet 32 so as to reduce the amount of magnetic field 'B' which is leaked from the device 40. In the device 40 the ferromagnetic material 43 is arranged to surround the whole periphery 41 of the magnet 32.

During use the ferromagnetic material 43 will channel magnetic flux/field 'B', which would otherwise be leaked from sides 45, 46 of the device 40, back towards the magnet 32. This has the advantage that the MEMS die 31 will be exposed to a stronger magnetic flux/field 'B'. Furthermore, when the device 40 is used for various applications, such as when the device 40 is used in an electronics device e.g. a projection device, other components which are located near the device 40 will experience less magnetic flux/field 'B'.

Figure 5:
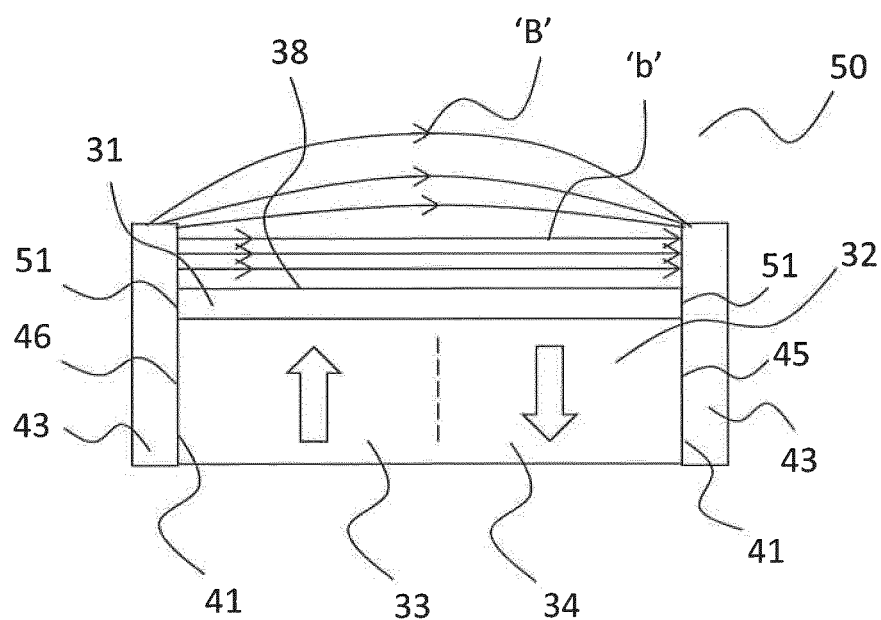
FIG. 5 provides a side view of a device according to a further embodiment of the present invention.

FIG. 5 provides a side view of a projection device 50 according to another embodiment of the present invention. The device 50 has many of the same features of the device 40 shown in FIG. 4 and like features are awarded the same reference numbers.

The device 50 further comprises ferromagnetic material 43 which is arranged to surround a periphery 41 of the single multi-pole magnet 32 and a periphery 51 of the MEMS die 31, so as to reduce the amount of magnetic flux/field 'B'' which is leaked from the device 50.

The ferromagnetic material 43 is configured to extend above the second surface 38 of the MEMS die 31. Advantageously this will ensure that the magnetic flux/field 'b' in the region of the MEMS die 31 (and thus in the region of the MEMS mirror, and first and/or second actuation coils) will be more uniform, in terms of force homogeneity and in terms of distribution.

Figure 6:
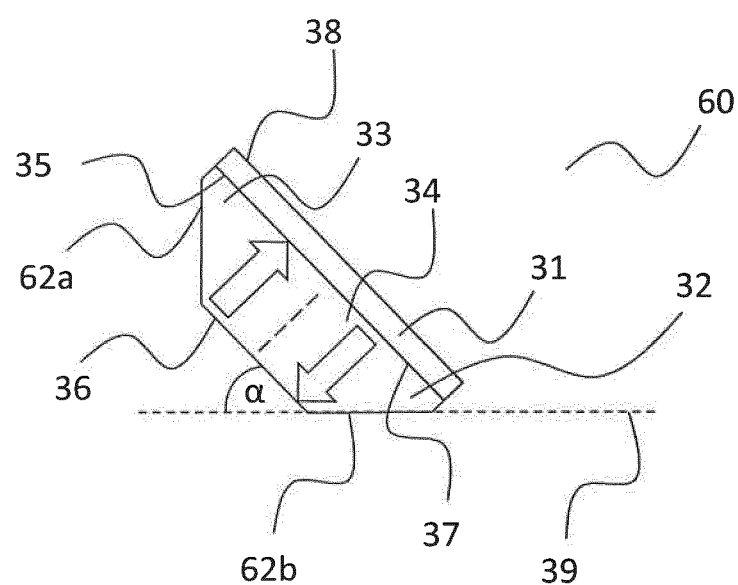
FIG. 6 provides a side view of a device according to a further embodiment of the present invention.

FIG. 6 provides a side view of a device 60 according to another embodiment of the present invention. The device 60 has many of the same features of the device 30 shown in FIG. 3 and like features are awarded the same reference numbers.

The device 60 comprises a MEMS die 31 and a single multi-pole magnet 32 which comprises chamfered edges 62a,b. Advantageously, the chamfered edges 62a,b will decrease the size and volume of the device 60. For example, the device 60 may be secured along at least one of its chamfered edges 62a,b to a surface; the chamfered edges 62a,b will reduce the distance between the surface and the mirror on the MEMS die 31 thus providing for a more compact device 60.

The chamfered edges 62a,b, are chamfered at an angel α, of 45°, to a plane 39 defined by a second surface 36 of the magnet 32.

The device 60 may be anchored along at least one of its chamfered edges 62a,b; the device 60 for example may be anchored along at least one of its chamfered edges 62a,b, in a scanning or projection device, using glue (or some other suitable connecting means) which is applied to a chamfered edge 62a,b.

It will be understood that each of the devices mentioned in this description may be used for various applications; for example the devices may form part of a projection device.

FIGS. 7a,b,c shows other possible shapes for the single multi-pole magnet 32 used in any of the devices 30,40,50,60 shown in FIGS. 3-6.

FIG. 7a shows a single multi-pole magnet 32 which comprise bevelled edges 71a,b. The bevelled edges 71a,b, are bevelled at an angel β, of 45° to a plane 39 defined by a second surface 36 of the magnet 32.

FIG. 7b shows a single multi-pole magnet 32 which comprises a single bevelled edge 75. The MEMS die 31 in this embodiment is arranged to cooperates with the single bevelled edge 75. It should be understood that the MEMS die 31 could be arranged to cooperate with any of the surfaces of the magnet 32.

FIG. 7c shows the single multi-pole magnet 32 may be configured to have a triangular cross section. A first MEMS die 31a is provided on a first surface 76 of the magnet 32 and a second MEMS die 31b is provided on a second surface 78 of the magnet 32, such that actuation coils provided on MEMS mirrors of each of the first and second MEMS dies 31a,b are submerged in a magnetic field 'B' provided by the magnet 32.

Figure 8A:
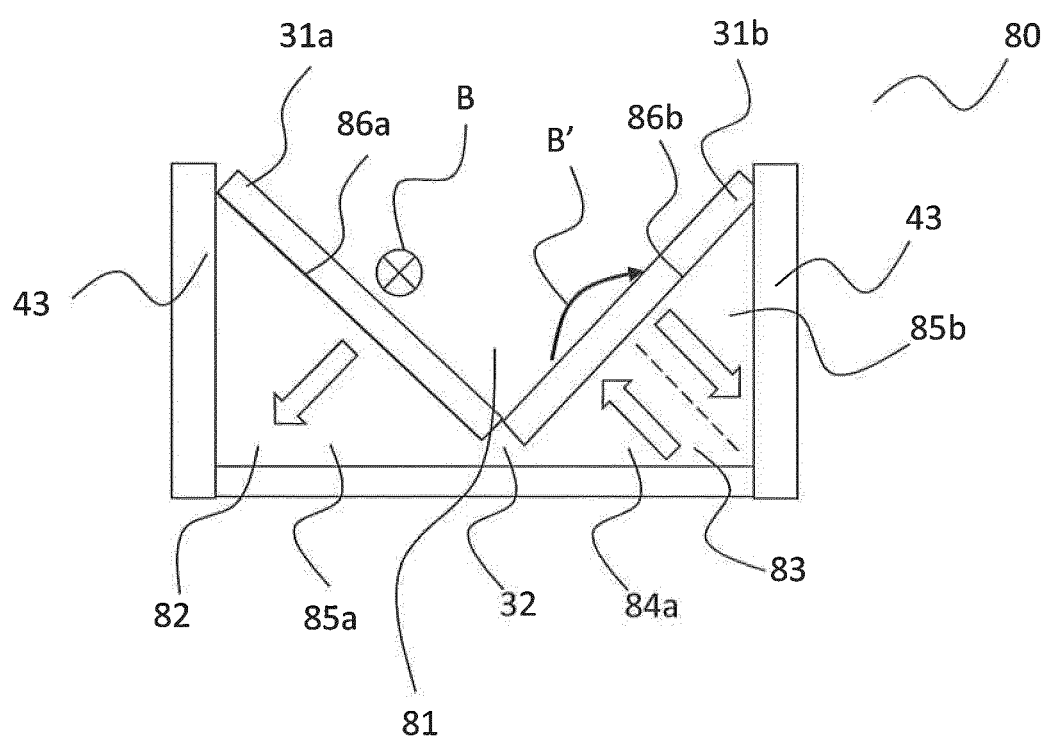
FIG. 8a provides a side view of a device according to a further embodiment of the present invention.

FIG. 8a provides a side view of a device 80 according to a further embodiment of the present invention. The device 80 has many of the same features of the devices 30,40,50,60 of the previous embodiments and like features are awarded the same reference numbers.

In the device 80 the single multi-pole magnet 32 is is configured to have a rectangular shaped cross section with a v-shaped cut-out 81. The magnet 32 is thus effectively configured to comprise a first and second triangular cross sectioned portions 82,83. Each triangular cross sectioned portion 82,83 comprises a first portion 84a, 84b (not shown), which has a first direction of magnetization and a second portion 85a,b, which has a second direction of magnetization; the first direction of magnetization is opposite to the second direction of magnetization. It should be noted that first portion 84b of the first triangular cross sectioned portion 82 is not visible in FIG. 8a as it is located behind second portion 85a; the direction of magnetisation of the first portion 84a and second portion 85b of the second triangular cross sectioned portion 83 is perpendicular to the direction of magnetisation of the first portion 84a (not visible) and second portion 85b of the first triangular cross sectioned portion 82.

A first MEMS die 31a is positioned on a surface of the first triangular cross sectioned portion 82 and the second MEMS die 31b which is positioned on a surface of the second triangular cross sectioned portion 83. The first and second MEMS dies 31a,b, are located on the respective opposing surfaces 86a,b which define the v-shaped cut out 81, so that the MEMS dies 31a,b are substantially facing one another and so that they in optical communication with one another.

An actuation coil provided on a MEMS mirror of the first MEMS die 31 will be submerged in a magnetic field 'B' provided by the first triangular cross sectioned portion 82 and an actuation coil provided on a MEMS mirror of the second MEMS die 31b will be submerged in a magnetic field 'B" provided by the second triangular cross sectioned portion 83.

The first MEMS die 31a is configured to have a MEMS mirror which oscillates about a first oscillation axis (not shown), and the second MEMS die 31b is configured to have a MEMS mirror which oscillates about a second oscillation axis (not shown). The first and the second MEMS dies 31a,b are orientated on the magnet 32 such that the first and second oscillation axes are orthogonal to each other. Accordingly, the first and second MEMS dies 31a,b can be used to scan light in two-dimensions e.g. vertically and horizontally, during operation.

It will be understood that in general, the device 30,40,50, 60,70,80 may comprise any number of MEMS dies 31. Each of the MEMS dies 31 may cooperate with the magnet 32, such that actuation coils provided on MEMS mirrors of the each of the MEMS dies 31 is submerged in a magnetic field 'B' provided by the magnet 32. Each of the MEMS dies 31 may have some or all of the features of the MEMS dies 31 shown in FIGS. 1b and 2. Preferably, the magnet 32 will be configured to have a plurality of surfaces, and each of the plurality of MEMS dies 31 will cooperate with a different surface. For example, the magnet 32 may be configured to have a triangular cross section so that it has at least three surfaces, and one of three MEMS dies 31 may cooperate with a respective surface. Similarly, the magnet 32 may be configured to comprise six surfaces e.g. may be configured to have a hexagonal cross section, or any number of surfaces; a MEMS die may be provided on each surface.

Figure 8B:
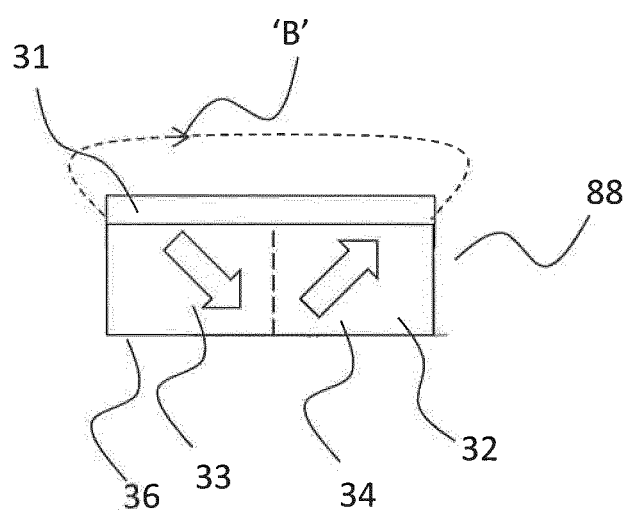
FIG. 8b provides a side view of a device according to a further embodiment of the present invention.

FIG. 8b provides a side view of a device 88 according to a further embodiment of the present invention. In this embodiment the single multi-pole magnet 32 comprises isotropic material.

The magnet 32 is configured to comprise a first portion 33 which has a first direction of magnetisation and a second portion 34 which has a second direction of magnetisation. Advantageously since the magnet 32 comprises isotropic material, the first and second portions 33,34 can be configured to have any direction of magnetisation. Unlike the device 30 shown in FIG. 1, the direction of magnetisation in the first and second portions 33,34 of the device 88 are in a direction other than horizontal and vertical; rather the first direction of magnetisation is the direction north-west and the second direction of magnetisation is in the direction southwest. In other words first and second directions of magnetisation are in directions which are substantially 45° to the second surface 36 of the magnet 32. This will enable the MEMS die 31 to experience a stronger magnetic field/flux 'B' in the desired orientation, perpendicular to an actuation coil provided on a MEMS mirror of the MEMS die 31. The actuation coil is preferably arranged parallel to the rotational axis of the MEMS mirror.

Figure 9A:
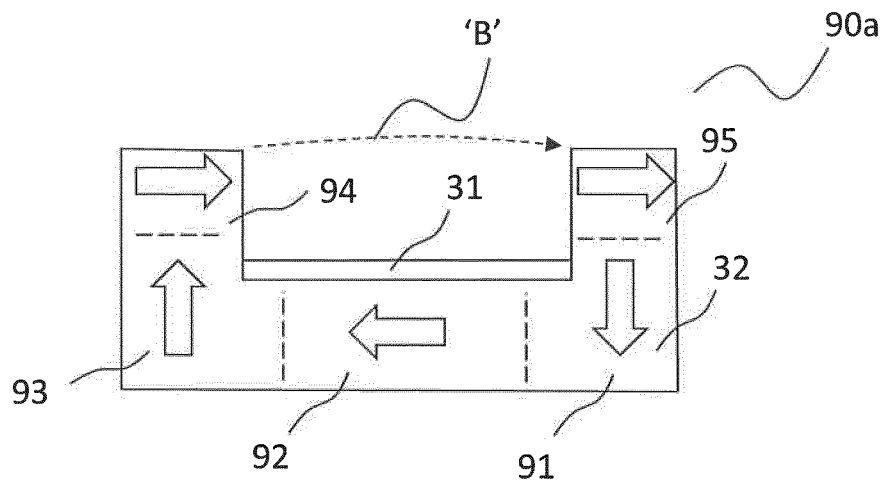
FIGS. 9a and b provide side views of devices according to a further embodiments of the present invention.

FIGS. 9a and b provide a side views of devices 90a,b according to a further embodiments of the present invention. The devices 90a,b may include any of the features of the previous embodiments e.g. the ferromagnetic material 43 shown in FIGS. 4 and 5 etc.

Each of the devices 90a,b are configured to have a u-shaped cross section. In each device 90a,b the single multi-pole magnet 32 is configured to comprise a first portion 91 which has a first direction of magnetisation and a second portion 92 which has a second direction of magnetisation, a third portion 93 which has a third direction of magnetisation, a fourth portion 94 which has a fourth direction of magnetisation and a fifth portion 95 which has a direction of magnetisation which is equal to the first direction of magnetization.

The devices 90a,b shown in FIGS. 9a and b are substantially the same, except the device 90a comprises anisotropic material and the device 90b comprises isotropic material.

As the device 90b comprises isotropic material the first and third directions of magnetisation provided in first and third portions 91,93 respectively are configured to be at 45° to the second surface 36 of the magnet 32. Whereas, in the device 90a the first and third directions of magnetisation provided in first and third portions 91,93 respectively, are configured to be at right angles to a second surface 36 of the magnet 32.

Figure 10A:
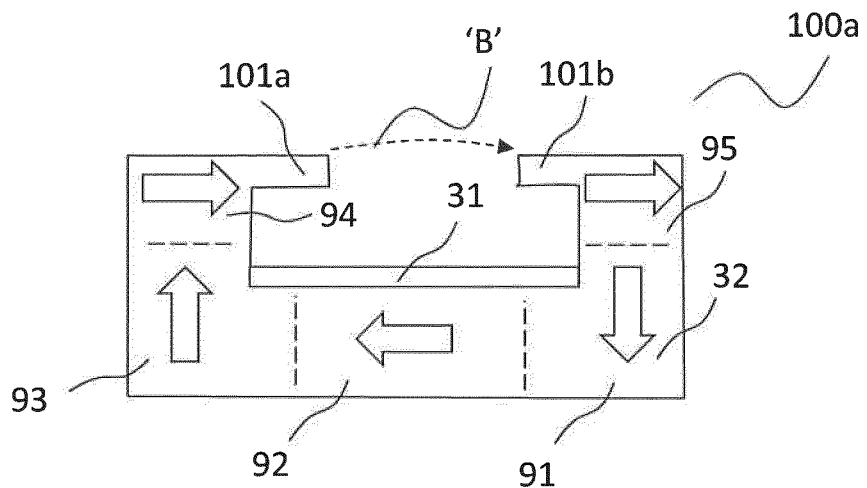
FIGS. 10a and b provide side views of devices according to a further embodiments of the present invention.
Figure 10B:
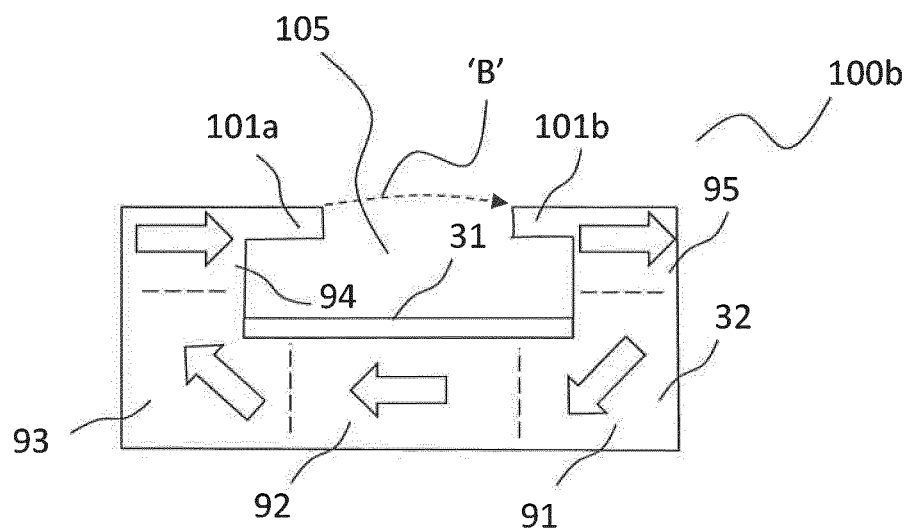

FIGS. 10a and b provide a side views of devices 100a,b according to a further embodiments of the present invention.

Figure 9B:
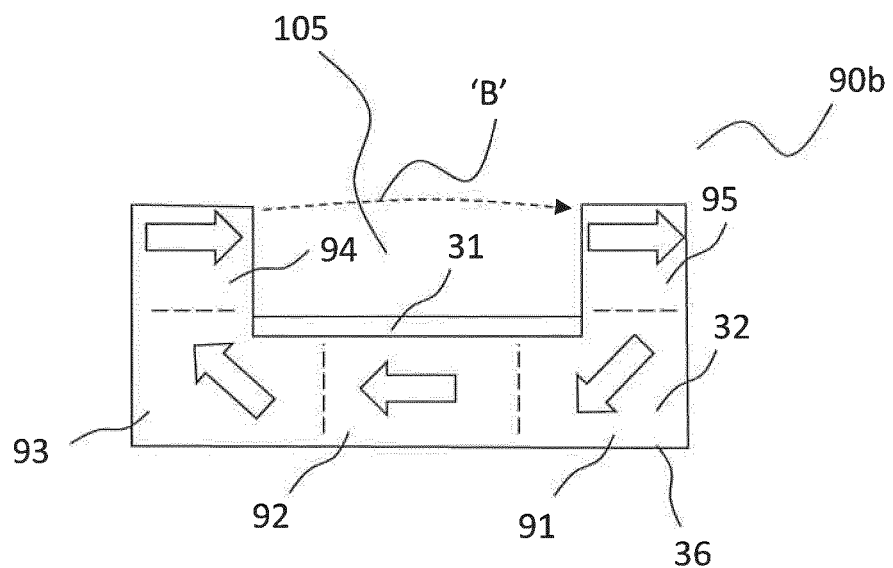

The devices 100a,b have the same features as devices 90a,b, respectively, as shown in FIGS. 9a and 9b, and like features are awarded the same reference numbers.

In each of the devices 100a,b the first and fifth portions of the single multi-pole magnet 32 further comprises flanges 101a,b. The flanges 101a,b will help to further reduce the amount of magnetic flux/field 'B' which is leaked from the device 100a,b.

In each of the devices 90a,b and 100a,b the MEMS die 31 is located in a recess 105 which is defined in the single multi-pole magnet 32. As the MEMS die 31 is arranged in the recess 105 the MEMS die 31 will be partially surrounded by the magnet 32. Such an arrangement will increase the amount of magnetic field/flux 'B' which the MEMS die 31 will experience and also provide magnetic field lines which are more parallel to each other and more homogeneous in intensity.

Figure 11:
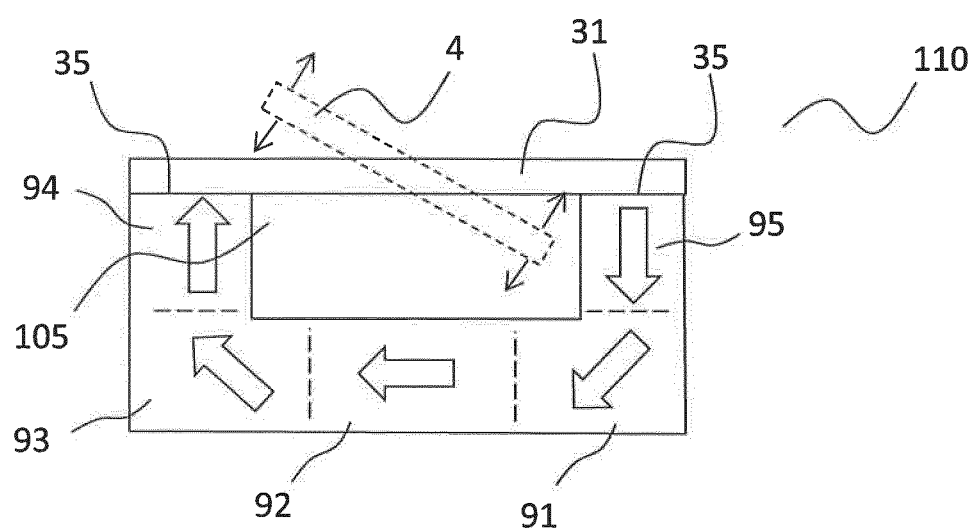
FIG. 11 provides a side view of a device according to a further embodiment of the present invention.

FIG. 11 provides a side view of a device 110 according to a further embodiment of the present invention. The device 110 has many of same features of the devices 90a,b shown in FIG. 9 and like features are awarded the same reference numbers.

In the device 110 the MEMS die 31 is arranged so that it is supported on the first surface 35 of the single multi-pole magnet 32. Such a configuration is useful if light which is be incident on the MEMS die 31 will approach the device 1 at an angle; since the incident light may otherwise be obstructed by the fourth and fifth portions 94,95 of the magnet 32 if the MEMS die 31 were to be located in the recess 105. As illustrated in FIG. 11, the recess 105 will receive part of the MEMS mirror 4 of the MEMS die 31 as the MEMS mirror 4 oscillates, thus the MEMS mirror 4 will be free to undergo larger oscillations compared to if the MEMS die 31 were located within the recess 105 (as is the case in devices 90a,b and 100a,b). In devices 90a,b and 100a,b the amplitude of oscillation of the MEMS mirror 4 on the MEMS die 31 will be restricted by the magnet 32; although optionally, the magnet 32 in devices 90a,b and 100a,b may be provided with an additional recess located below the MEMS die 31 to enable the MEMS mirror 4 to undergo larger oscillations even when the MEMS die 31 is located in the recess 105.

Figure 12A:
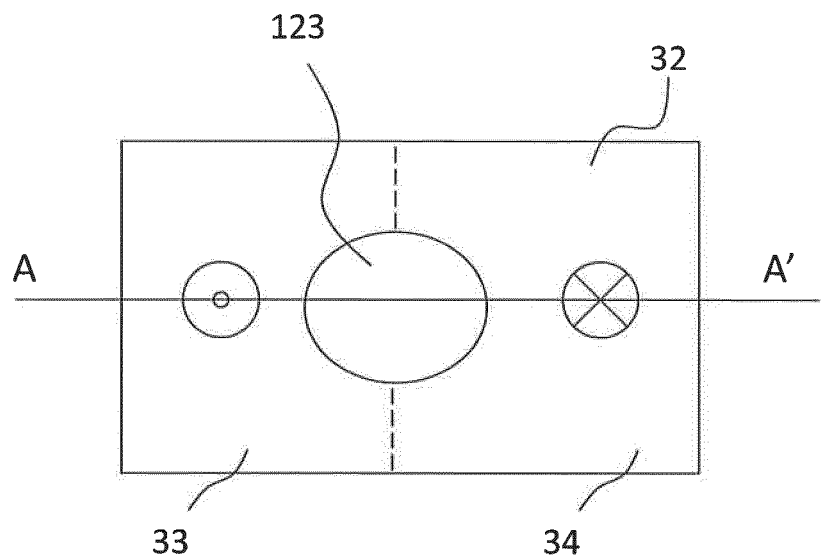
Figure 12B:
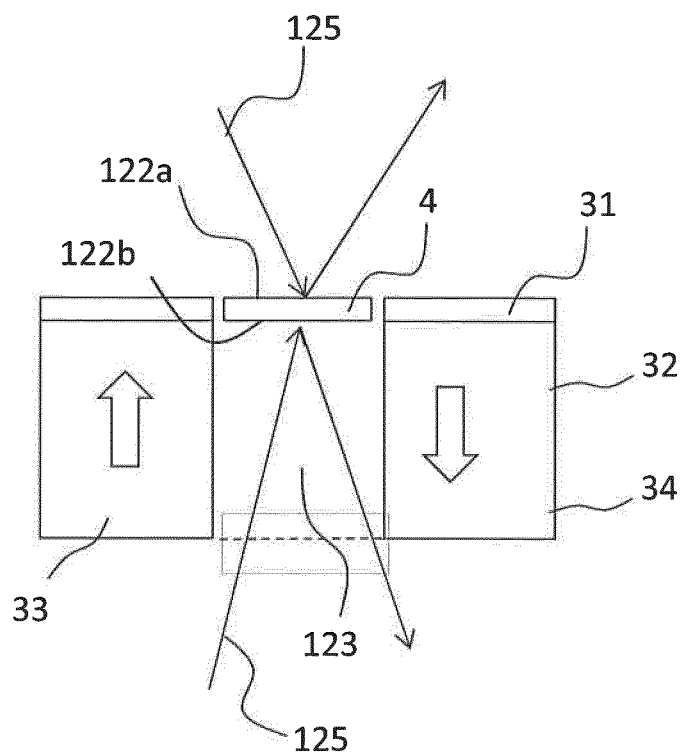

FIG. 12a provides a plan view of an undersurface of device 120 according to a further embodiment of the present invention. FIG. 12b provides a cross-sectional view of the device 120 taken along section A-A' of FIG. 12a. The device 120 has many of the same features as the device 30 shown in FIG. 3 and like features are awarded the same reference numbers.

Referring to FIGS. 12a and b; in the device 120 the MEMS mirror 4 of the MEMS die 31 comprise a first and second reflective surface 122a,122b. The first and second reflective surfaces 122a,b define opposite surfaces of the MEMS mirror 4.

The single multi-pole magnet 32 further comprises an aperture 123, which is adjacent the MEMS mirror 4. The aperture 123 allows light 125 to pass through the magnet 32 and be received by the second surface 122b of the MEMS mirror 4. Accordingly two opposing surfaces 122a,b of the MEMS mirror 121 can be used to reflect light 125.

Figure 13A:
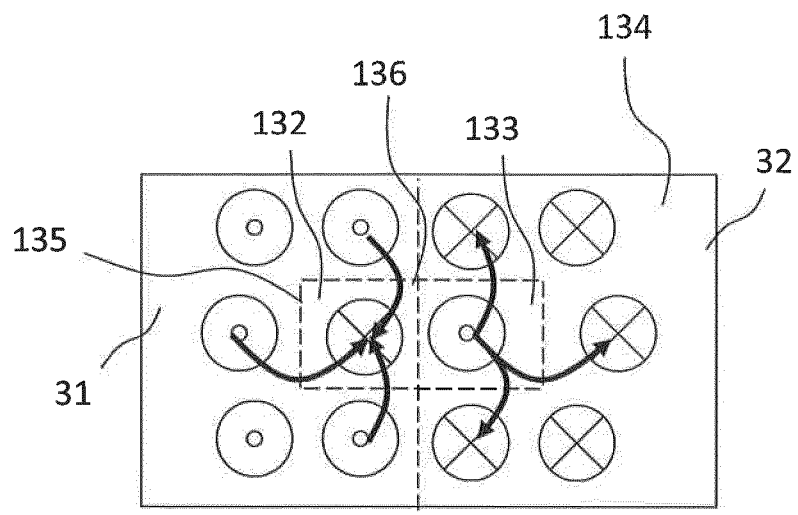
FIG. 13a provides a plan view of a magnet which is used in device according to a further embodiment of the present invention.
Figure 13B:
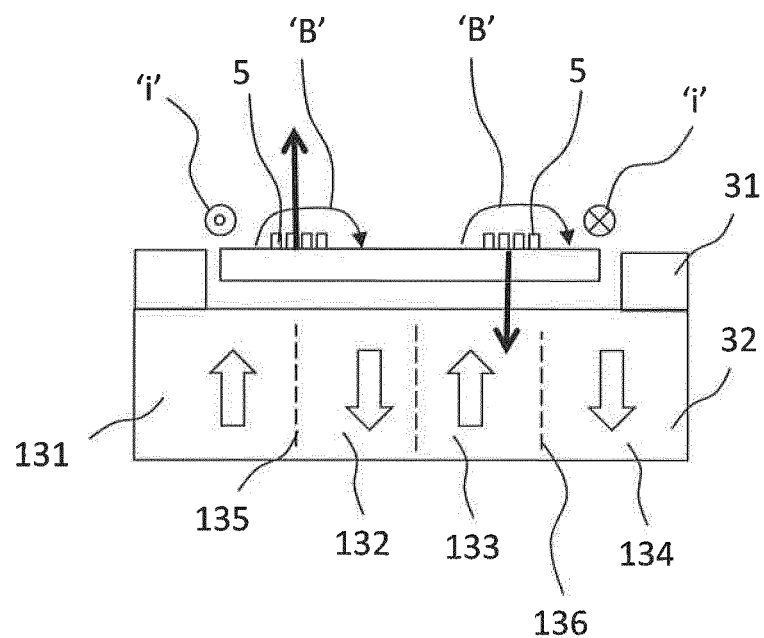

FIG. 13a provides a plan view of a single multi-pole magnet 32 which is used in a device according to a further embodiment of the present invention. It will be understood that a MEMS die 31, which comprises the features of the MEMS die of FIG. 1b, would be arranged to cooperate with the magnet 32, as shown in FIG. 13a, as is shown in FIG. 13b.

Figure 14:
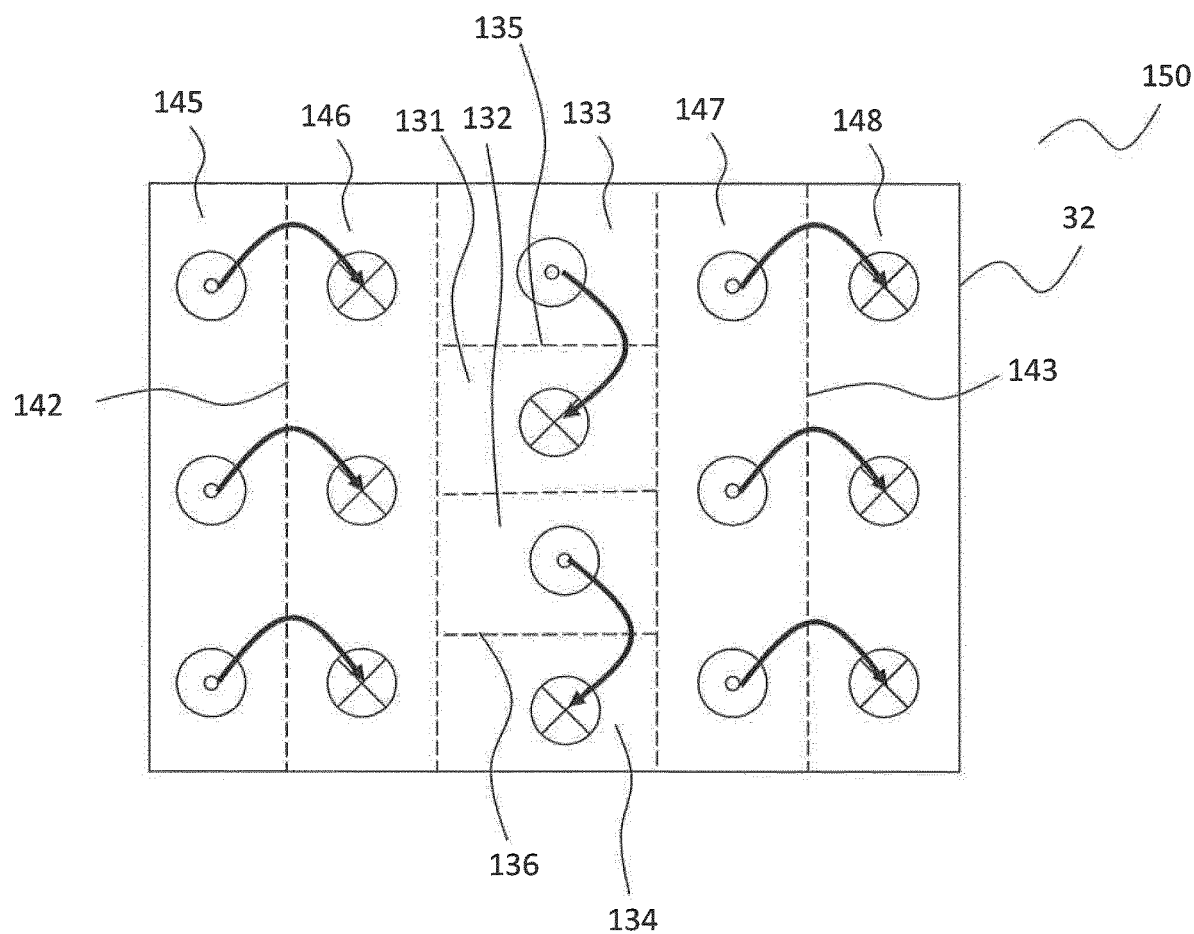
FIG. 14 provides a plan view of a magnet which is used in device according to a further embodiment of the present invention.

The magnet 32 is configured to comprise a first portion 131 which has a first direction of magnetisation, a second portion 132 which has a second direction of magnetisation, a third portion 133 which has a direction of magnetisation equal to the first direction of magnetisation, and a fourth portion 134 which has a direction of magnetisation which is equal to the second direction of magnetisation. In FIGS. 13 and 14, the direction of magnetization is indicated by arrow heads and arrow tails, the arrow head indicating a direction out of the page and the arrow tail indicating a direction into the page.

In this particular example the first portion 131 is configured to have a c-shaped transverse section and the fourth portion 134 is configured to have a reverse-c-shaped transverse section. The second portion 132 is partially surrounded by the first portion 131. The third portion 133 is partially surrounded by the fourth portion 134. It will be understood that the first, second, third and fourth portions 131,132, 133,134 may comprise any other shape; for example the first, second, third and fourth portions 131,132, 133,134 may alternatively be configured to have an rectangular shaped transverse section or to have a square transverse section with or without cut edges.

A first interface 135 will exist between the first and second portions 131,132. A second interface 136 will exist between the third and fourth portions 133,134. Although the interfaced as shown, it should be remembered that the portions 131,132, 133,134 are defined by a single magnet and that the interfaces are simply defied by the junctions between the respective portions.

The first, second, third and fourth portions 131,132, 133,134 are dimensioned such that the first and second interfaces 135,136 are adjacent to a first actuation coil 5 provided on the MEMS die 31 (as can be seen in FIG. 13b). Preferably the portions 131,132, 133, 134 are dimensioned such that the first and second interfaces 135,136 are adjacent to the whole length of the first actuation coil 5 which is provided on MEMS mirror 4 of the MEMS die 31. In this embodiment the magnetic field 'B' generated by the magnet 32 will assist in reducing unwanted modes of vibration of the MEMS mirror 4.

FIG. 14 provides a plan view of a single multi-pole magnet 32 which is used in a device according to a further embodiment of the present invention. It will be understood that a MEMS die 31, which comprises the features of the MEMS die of FIG. 2, would be arranged to cooperate with the magnet 32.

The single multi-pole magnet 32 is configured to comprise a first portion 131 which has a first direction of magnetisation, a second portion 132 which has a second direction of magnetisation, a third portion 133 which has a direction of magnetisation equal to the second direction of magnetisation, and a fourth portion 134 which has a direction of magnetisation which is equal to the first direction of magnetisation. The magnet 32 is further configured to comprise a fifth portion 145 which has a direction of magnetisation which is equal to the second direction of magnetisation, and a sixth portion 146 which has a direction of magnetisation which is equal to the first direction of magnetisation, and a seventh portion 147 which has a direction of magnetisation which is equal to the second direction of magnetisation, and an eight portion 148 which has a direction of magnetisation which is equal to the first direction of magnetisation.

Optionally the first, second, third and fourth portions 131, 132, 133, 134, may be configured to have some or all of the features of the first, second, third and fourth portions 131, 132, 133, 134, of device 130 shown in FIG. 13. In FIG. 14 the first, second, third and fourth portions 131, 132, 133, 134 are shown to each have a square shaped transverse section.

As illustrated in FIG. 14, the fifth, sixth, seventh and eight portions 145, 146, 147,148 each comprise a rectangular transverse section. It will be understood that the fifth portion 145 could alternatively have a c-shaped transverse section and the eight portion 148 could alternatively have a reversed-c-shaped transverse section, similar to the first and fourth sections 131, 134 shown in FIG. 13.

A first interface 135 will exist between the first and second portions 131,132. A second interface 136 will exist between the third and fourth portions 133,134. A third interface 142 will exist between the fifth 145 and sixth portions 146 and a fourth interface 143 will exist between the seventh 147 and eight 148 portions. The fifth, sixth, seventh and eight portions 145, 146, 147, 148, are dimensioned such that the third and fourth interfaces 142,143 are adjacent to at least a portion of the second actuation coil (not shown) which is provided on a first support frame of the MEMS die 31 (not shown) which cooperates with the magnet 32. In this embodiment the magnetic field 'B' generated by the magnet 32 will assist in reducing parasitic motion due to unwanted modes of vibration and/or cross magnetic coupling effect (i.e. the magnetic field generated to actuate one specific axis is providing some energy to create parasitic actuation of the other axis). Although the interfaces 142, 143 are shown, it should be remembered that the portions 145, 146, 147, 148 are defined by a single magnet and that the interfaces are simply defined by the junction between the respective portions.

It will be understood that if the fifth portion 145 was configured to have a c-shaped transverse section and the eight portion 148 was configured to have a reversed-c-shaped transverse section, then the fifth, sixth, seventh and eight portions 145, 146, 147, 148, could be dimensioned such that the third and fourth interfaces 142,143 are adjacent to the whole length of the second actuation coil which is provided on first support frame of the MEMS die 31.

Figure 15:
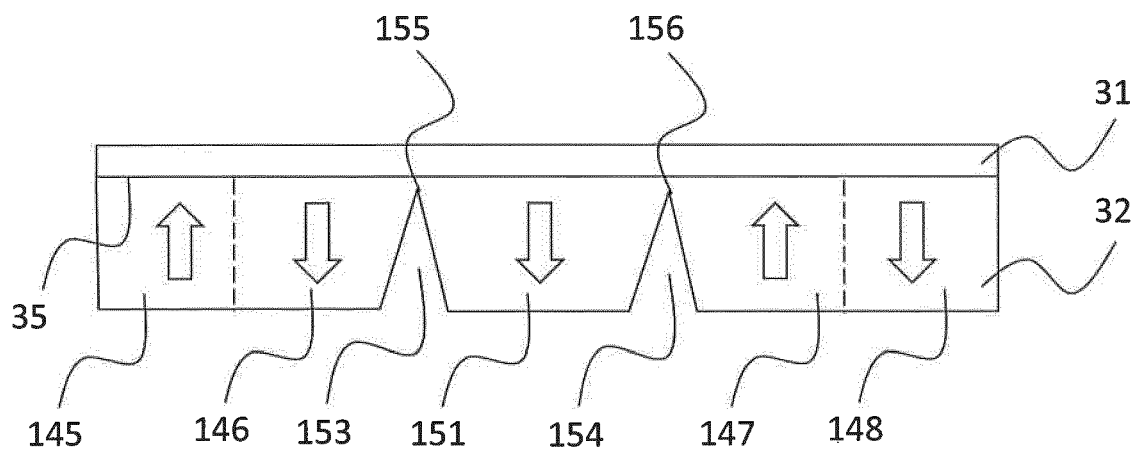
FIG. 15 provides a side view of a device according to a further embodiment of the present invention.

FIG. 15 provides side view of a device 150 according to a further embodiment of the present invention. The device 150 comprises a single multi-pole magnet 32 which has the same features as the single multi-pole magnet 32 shown in FIG. 14. A MEMS die 31, which has the same features of the MEMS die shown in FIG. 2, cooperates with the first surface 35 of the magnet 32.

The magnet 32 further comprises areas of reduced thickness which are defined by channels 153,154 which are provided in the single multi-pole magnet 32. A first channel 153 is provided at an interface 155 between the sixth portion 146 and a central portion 151 of the magnet 32 (the central portion of the magnet 32 is the part of the magnet 32 which which comprises the first, second, third and fourth portions 131-134). A second channel 154 is provided an interface 156 between the seventh portion 147 and a central portion 151 of the magnet 32.

The channels 153,154 will decrease the magnetic field in the region of the channel. Preferably, the channels 153,154, provide for a substantially zero, or zero, magnetic field in the region of the channel. Thus the first channel 153 will assist in reducing the leakage of magnetic field from the fifth and sixth portions 145,146 to the central portion 151 of the magnet 32 and the second channel 154 will assist in reducing the leakage of magnetic field from the seventh and eight portions 147,148 to the central portion 151 of the magnet 32. It should be understood that this region where the magnetic field is substantially zero can be either generated by physically removing part of the magnet material, or also during magnet magnetization process, by using a magnetizing tool that is design to avoid magnetizing parts of the magnet while magnetizing other parts. So in otherwords instead of providing regions of reduced thickness or channels, one may design the magnet 32 such that it has zero magnetization at the interfaces 155,156. Indeed the tool may be designed to create a specific magnetic field that corresponds only to where the magnet should be magnetized, the rest of the magnet area remaining non-magnetized because it is not subject to the magnetic field created by the magnetization tool.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

What is claimed is:

1. A device comprising:
   a single magnet comprising a first portion having a first direction of magnetization and a second portion having a second direction of magnetization, the magnet at least partially forming a recess between the first portion and the second portion, the magnet to generate a magnetic field from the first portion to the second portion across the recess; and
   a MEMS die coupled to the magnet, the MEMS die at least partially positioned within the recess and partially surrounded by the magnet, the MEMS die comprising a MEMS mirror and an actuation coil, the MEMS mirror comprising a reflective surface, the MEMS mirror being responsive to operation of the actuation coil.

2. The device of claim 1, wherein the first direction of magnetization is a first magnetic pole and the second direction of magnetization is a second magnetic pole.

3. The device of claim 1, wherein the recess includes a recess depth, wherein the MEMS die includes a die height, wherein the recess depth is greater than the die height, wherein the MEMS die is positioned within the recess at a depth that is greater than the die height.

4. The device of claim 1, wherein the magnet further comprises:
   a first flange extending from the first portion partially over the recess; and
   a second flange extending from the second portion partially over the recess, wherein the MEMS die is at least partially enclosed within the recess by the first portion, the second portion, the first flange, and the second flange.

5. The device of claim 4, the magnet further comprising a third portion which connects the first portion and the second portion, the third portion positioned on an opposite side of the recess from the first flange and the second flange, wherein the MEMS die is at least partially enclosed within the recess by the first portion, the second portion, the third portion, the first flange, and the second flange.

6. The device of claim 1, wherein the actuation coil to rotate the MEMS mirror about an axis.

7. The device of claim 1, wherein the actuation coil is a first actuation coil, wherein the device includes a second actuation coil, wherein the first actuation coil to rotate the MEMS mirror about a first axis and the second actuation coil to rotate the MEMS mirror about a second axis.

8. The device of claim 1, wherein the magnet includes two or more magnetic portions and a ferromagnetic material that at least partially surrounds the two or more magnetic portions.

9. The device of claim 8, wherein the two or more magnetic portions includes two or more directions of magnetism.

10. A device comprising:
a magnet comprising a first magnetized region and a second magnetized region;
a first MEMS die coupled to a first surface of the magnet, the first MEMS die comprising a first MEMS mirror and a first actuation coil, the first MEMS mirror comprising a first reflective surface, the first MEMS mirror being responsive to operation of the first actuation coil; and
a second MEMS die coupled to a second surface of the magnet, the second MEMS die comprising a second MEMS mirror and a second actuation coil, the second MEMS mirror comprising a second reflective surface, the second MEMS mirror being responsive to operation of the second actuation coil.

11. The device of claim 10, wherein the magnet at least partially forms a v-shaped cut out, wherein the first surface of the magnet is a first side of the v-shaped cut out, wherein the second surface of the magnet is a second side of the v-shaped cut out.

12. The device of claim 10, wherein the first magnetized region includes a first direction of magnetization, wherein the second magnetized region includes at least two second directions of magnetization.

13. The device of claim 10, further comprising:
ferromagnetic material coupled to the magnet, the ferromagnetic material defining a first wall coupled to the first magnetized region and defining a second wall coupled to the second magnetized region, the ferromagnetic material to channel magnetic flux to reduce leakage of the magnetic flux.

* * * * *